Figure 6:
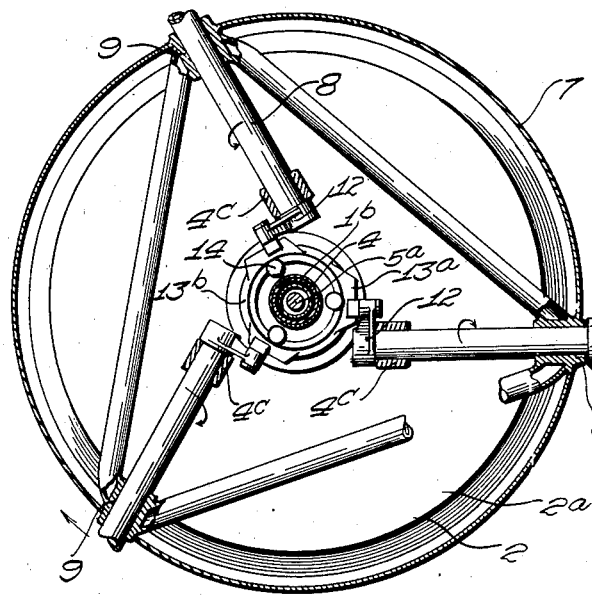

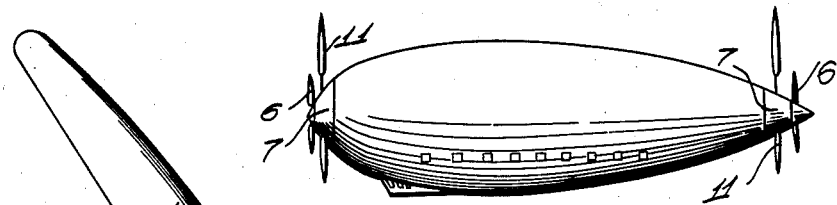
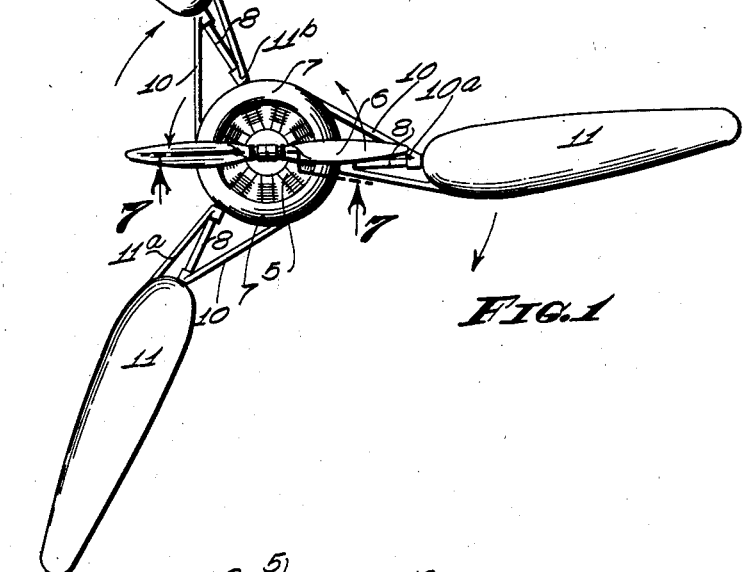
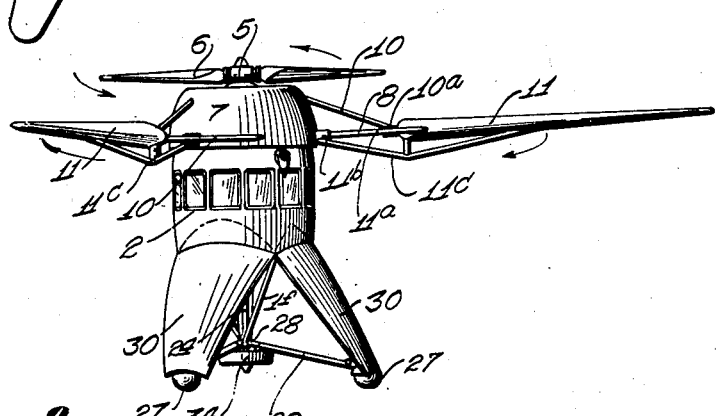

June 9, 1936.   G. E. McPHERREN   2,043,704
AIRCRAFT
Filed July 19, 1933   4 Sheets-Sheet 2
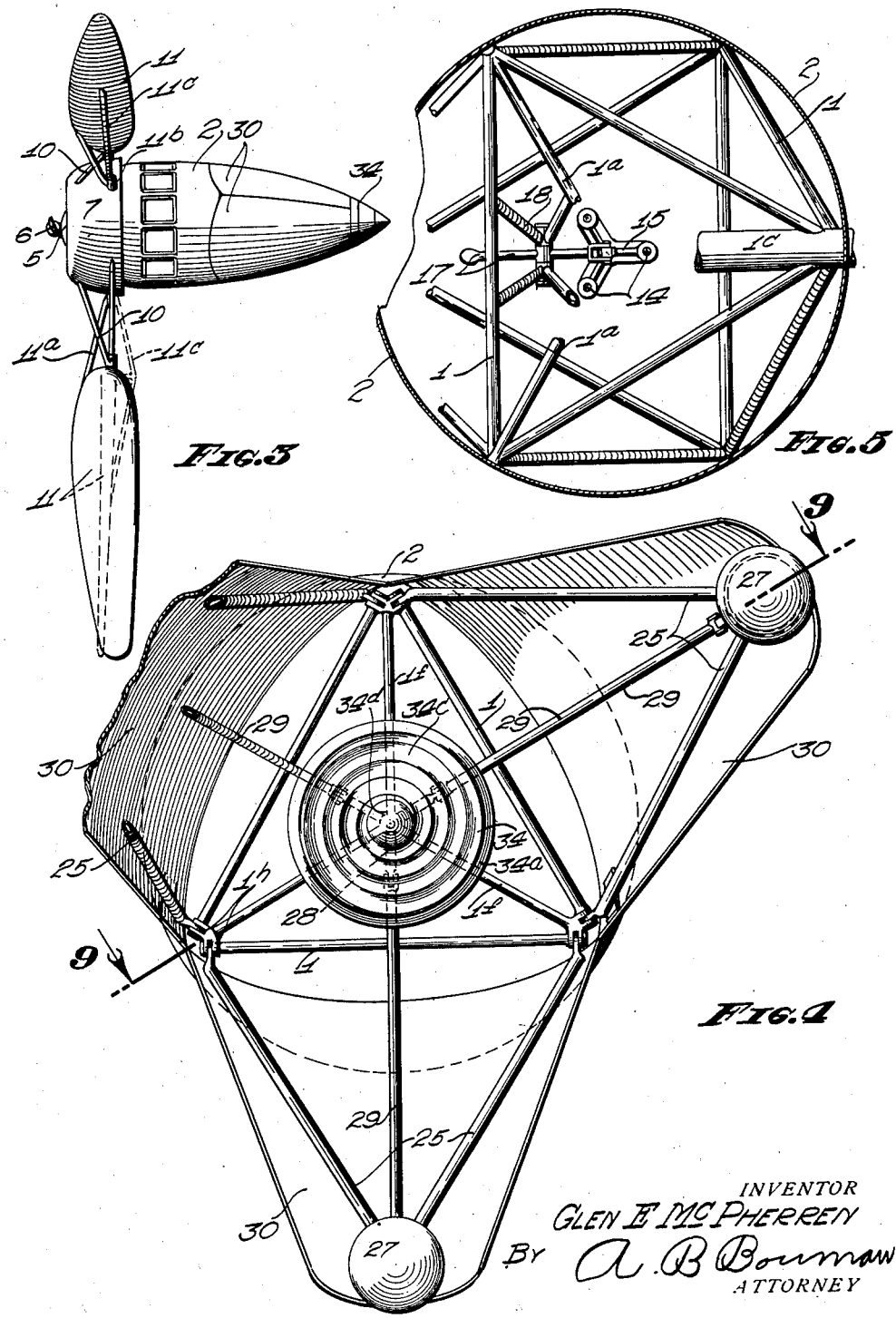

June 9, 1936.    G. E. McPHERREN    2,043,704
AIRCRAFT
Filed July 19, 1933    4 Sheets-Sheet 3

INVENTOR
GLEN E. McPHERREN
BY A. B. Bowman
ATTORNEY

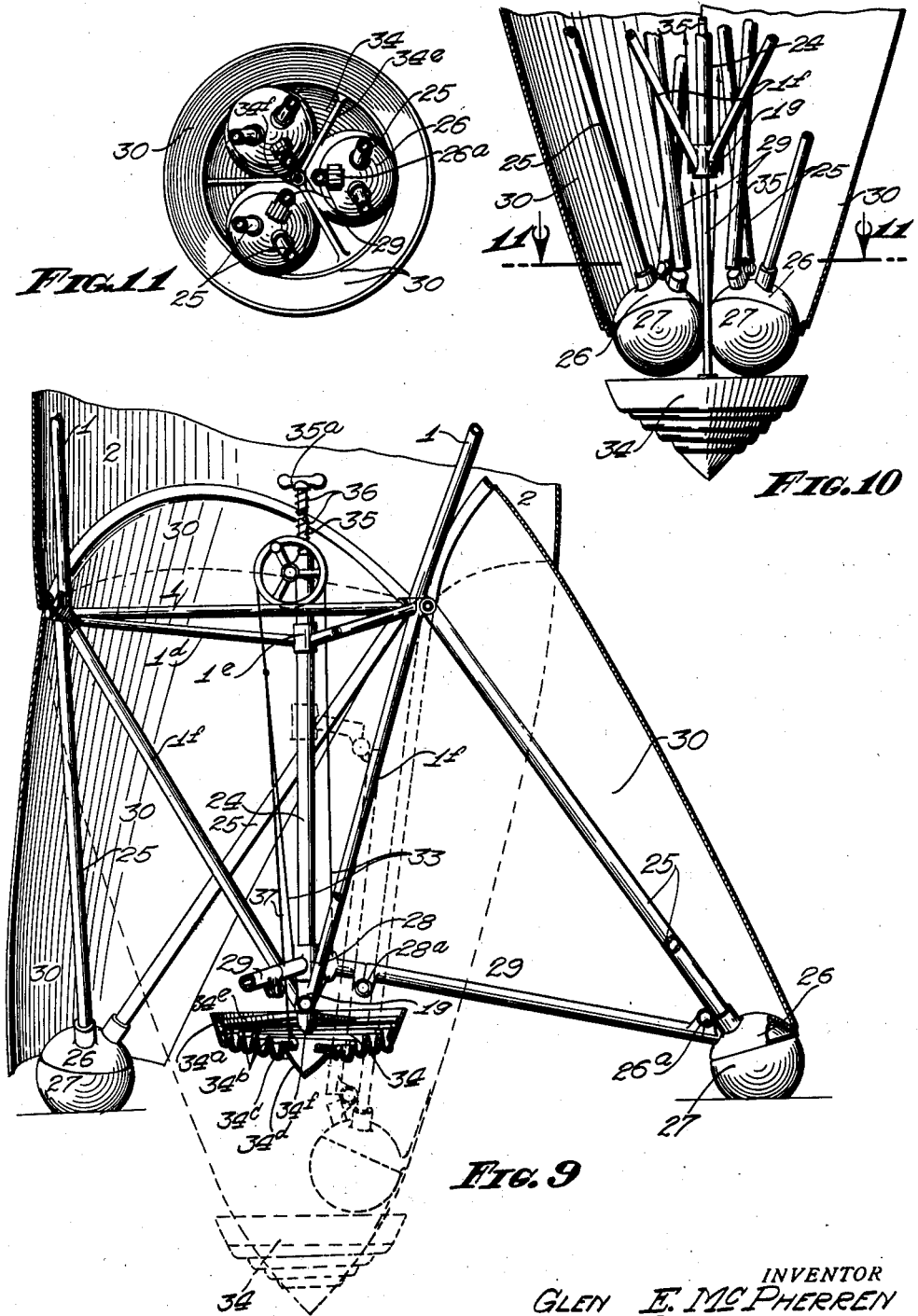

Patented June 9, 1936

2,043,704

UNITED STATES PATENT OFFICE 2,043,704

AIRCRAFT

Glen E. McPherren, San Diego, Calif.

Application July 19, 1933, Serial No. 681,097

3 Claims. (Cl. 244—19)

My invention relates to aircraft, and the objects of my invention are:

First, to provide an aircraft which is capable of landing or taking off vertically without a run;

Second, to provide an aircraft which is capable of vertical ascent or descent, and may be controlled in such a manner that its movements horizontally or vertically may be extremely slow or fast as desired; thus enabling the aircraft to land gently and thereby permitting the use of relatively light landing gear;

Third, to provide an aircraft of this class wherein the air foil surfaces are reduced to a minimum, thereby increasing their efficiency to a maximum;

Fourth, to provide an aircraft of this class in which its sustaining force is created independent of bodily movement of the aircraft, and may be readily and quickly varied;

Fifth, to provide an aircraft of this class which entirely eliminates the need of tail control members, the sustaining means functioning also as a control for the aircraft;

Sixth, to provide an aircraft of this class wherein the sustaining means revolves in a direction opposite to the propeller and about a common center, and is connectable to the opposite side of a common driving means, thereby enabling the actual R. P. M. of the propeller to be less than the R. P. M. of the driving means without the use of a reduction gear, and wherein the propeller torque is balanced by the opposite torque of the sustaining means, and wherein the thrust of both the sustaining means and the propeller are utilized;

Seventh, to provide an aircraft of this class which incorporates a novel control means for controlling the angle of attack of the blades of the sustaining means either in unison or variably;

Eighth, to provide an aircraft of this class in which parasitic resistance is reduced to a minimum, and is capable of particularly rapid flight;

Ninth, to provide an aircraft of this class which incorporates a novel folding landing gear so arranged that it is perfectly streamlined when the aircraft is in flight;

Tenth, to provide an aircraft of this class wherein the fuselage may be rotated with the propeller or with the sustaining means at will so that the pilot therein may turn in any direction, thereby providing an airplane which, being capable of performing all the other customary maneuvers of aircraft, renders itself particularly suitable for war purposes;

Eleventh, to provide an aircraft of this class which of necessity in getting underway gives a thorough test to all members and their proper functioning; and Twelfth, to provide on the whole a novelly constructed aircraft which is simple of construction in proportion to its functions, and is durable and efficient in its actions.

Figure 8:
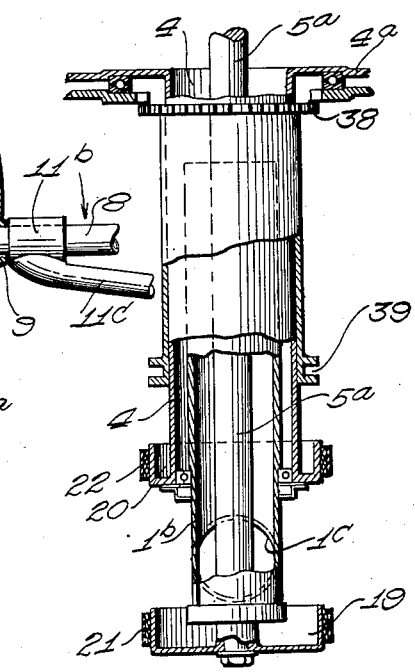
Figure 7:
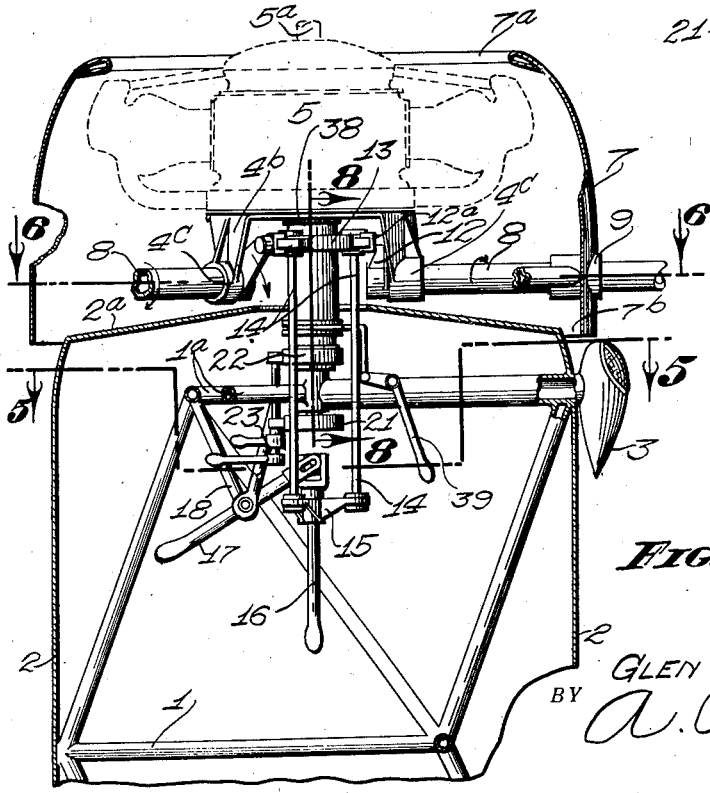

With these and other objects in view as will appear hereinafter, my invention consists of certain novel features of construction, combination, and arrangement of parts and portions as will be hereinafter described in detail and particularly set forth in the appended claims, reference being had to the accompanying drawings and to the characters of reference thereon which form a part of this application, in which:

Figure 1 is a plan view of the aircraft when in its landing position; Fig. 2 is a side elevational view thereof also when in its landing position; Fig. 2A is a reduced side elevational view of an airship utilizing my apparatus as a propulsion and control means; Fig. 3 is another side elevational view of the aircraft shown in one of its flying positions; Fig. 4 is an enlarged bottom view of the aircraft in its landing position; Fig. 5 is an enlarged transverse sectional view through 5—5 of Fig. 7; Fig. 6 is another transverse sectional view through 6—6 of Fig. 7; Fig. 7 is a fragmentary longitudinal sectional view through 7—7 of Fig. 1; Fig. 8 is an enlarged fragmentary sectional view through 8—8 of Fig. 7; Fig. 9 is an enlarged fragmentary sectional view of the landing gear taken through 9—9 of Fig. 4; Fig. 10 is a similar sectional view with the landing gear folded and with the tail sleeve lowered to permit the opening or folding of the landing gear; and Fig. 11 is a transverse sectional view through 11—11 of Fig. 10 likewise showing the landing gear in its folded position.

Similar characters of reference refer to similar parts and portions throughout the several views of the drawings.

Fuselage framework 1, fuselage covering 2, carburetor means 3, motor support 4, motor 5, propeller 6, cowling 7, wing shafts 8, bearings 9, struts 10, wings 11, crank arms 12, control ring 13, connecting rods 14, spider member 15, control arm 16, control lever 17, bracket 18, drums 19 and 20, clamp bands 21 and 22, operating means 23, guide tube 24, struts 25, cushion supports 26, ball cushions 27, spider 28, folding braces 29, cowling 30, idler pulley wheels 31, driving pulley wheels 32, cables 33, tail sleeve 34, rod 35, spring 36, cable 37, clutch 38, and clutch control 39 constitute the principal parts and portions of my aircraft.

The fuselage is circular in cross section and is provided with internal framework 1, preferably formed of tubing and forming several bays. The tubing defining each bay is preferably triangular in form as is also the bracing between the bays, thus providing a particularly rigid but light construction. The framework 1 is provided with a suitable circular covering 2. At the upper end of the fuselage or the forward end when in flight there is provided a suitable fire wall 2a. The framework 1 includes at its upper end or forward end several radiating tubes 1a which support a sturdy supporting tube 1b of sturdy construction which extends upwardly or forwardly through the fire wall 2a. One of the radiating tubes is enlarged in section and communicates with the supporting tube 1b so as to form an air intake passage for the motor to be described hereinafter. Said enlarged tube designated 1c is joined to a suitable carburetor means 3, arranged outside the fuselage and therefore suitably streamlined.

Journaled upon the supporting tube 1b is a motor support 4. The motor support 4 is tubular and extends upward through the fire wall. Its upper end is provided with an outward extending flange 4d upon which is mounted a conventional radial motor 5 indicated by dotted lines in Fig. 7. The motor includes a shaft 5a to which at its upper end is connected a propeller 6.

Clutch 38 provides means for connecting the wing shafts 8 to one side of the source of power or motor 5. Control means 39 throw clutch 38 in or out.

Supported from the motor 5 is a cowling 7 which is annular in form and forms with the motor an intake opening 7a at its upper or forward end and with the fuselage an opening 7b at its lower end.

The motor support 4 is provided at the periphery of its flange 4a with three depending or rearwardly extending brackets 4b at the extremities of which are substantially radially positioned bearings 4c. The several bearings 4c support the inner ends of the wing shafts 8. These shafts extend outwardly through the cowling 7 and adjacent the cowling pass through bearings 9. The shafts 8 are again supported by bearings 10a mounted at the extremities of struts 10 extending outwardly from the cowling 7.

The three wing shafts 8 may, if desired, form the main spars of wings 11 which are mounted at their extremities. Each wing has a typical air foil section. As will be brought out hereinafter, the air flow over the wing surfaces is relatively fast so that a relatively thin air foil shape is preferable so that the drag may be reduced to a minimum. Each wing has its greatest chord near its root and decreases in width towards its outer extremity. From the leading edge of each wing at its root end there is provided a spar 11a which extends rearwardly and radially inwardly towards the shaft 8 and is provided with a bearing 11b which journals said shaft adjacent the cowling 7. Other struts 11c may extend from the bearing 11b to the under side of the wing and may be in the form of a cantilever bracing, as shown best in Fig. 2. With this arrangement it is possible to rotate the wings 11 and their shafts 8 approximately 120°, thus making it possible to so tilt the wings that their thrust would oppose the propeller thrust. That is from a position shown in Fig. 2 to a position shown in Fig. 3.

Inasmuch as the wings are connectible to the cylinders of the motor and the motor is journaled as a unit with respect to the fuselage, it is obvious that operation of the motor drives the wings 11 in one direction and the propeller 6 in the other direction. However, the wings being larger their rotation is not as rapid as that of the propeller. A more detailed description of the aircraft will be given hereinafter.

The radially inner end of each shaft 8 is provided with a crank arm 12 each of which is provided with a journal and yoke means 12a at its extremity. The yoke of each crank arm is adapted to fit a guide 13a forming a part of a control ring 13. The control ring 13 is in the form of a relatively large bearing having an outer race 13b supporting the guides 13a and an inner race 13c. The control ring 13 normally occupies a position with its axis coinciding that of the motor 5 and the fuselage. The control ring is adapted to shift longitudinally with respect to such axis as well as to wabble or tilt with respect to such axis. In the first case the wings are rotated in unison; in the second case each wing as it approaches a given point with respect to the fuselage is tilted. A combination of these two movements effects control of the aircraft as will be brought out in more detail hereinafter. The inner race 13c of the control ring 13 is attached to a plurality of rearwardly or downwardly extending connecting rods 14 by suitable universal joint means. The connecting rods 14 extend through the fire wall 2a and are joined at their rearward or lower ends through suitable universal joint connections to a spider member 15. The spider member 15 is provided with a control arm 16 extending axially therefrom which when shifted causes tilting of the spider member and consequently causes a similar movement of the control ring 13. The spider member 15 is likewise connected through a suitable universal joint to a control lever 17 supported from a suitable bracket 18 in such a manner that movement of the control lever 17 causes bodily and axial movement of the spider member and a like movement of the control ring 13.

The shaft 5a of the motor extends downwardly and protrudes through the lower end of the tubular support 1b. A drum 19 is provided at this end of the shaft 5a. A similar drum 20 is formed on the extended rearward or lower end of the motor support 4. The drums 19 and 20 are provided with clamp bands 21 and 22 which are suitably supported from the framework and are provided with operating means 23 so that the framework and fuselage may be connected with either the shaft or the motor support and consequently revolve with either the propeller or wings; suitable provision being made to prevent the fuselage from revolving at too rapid a rate.

The framework 1 is provided with radially inwardly extending tubes 1d which support a centered collar 1e. Likewise the framework is provided with downwardly and inwardly extending brace rods 1f which terminate in a centered collar 1g. The collar 1g is spaced downwardly and rearwardly considerable distance from the collar 1e and these members support an axially extending guide tube 24.

Inasmuch as the framework comprises triangular sections, there is provided three brace rods 1f. At the junctures of these rods with the corners of the adjacent bay of the framework there are provided pairs of hinge members 1h.

The several hinge members are arranged in axially alined pairs with their axes delineating the three sides of the triangle. Hinged to each pair of hinge members is a downwardly or rearwardly converging pair of struts 25 which connect at their lower adjacent ends to a cushion support 26. The cushion support 26 is substantially semi-spherical in form and is provided with a spherical ball cushion 27 which is preferably pneumatic. Slideably mounted upon the guide tube 24 is a spider 28 which is provided with three arms extending between the three braces 1f and connected by hinge means 28a to three folding braces 29. The braces 29 are connected at their extended ends by other hinge elements 26a to the cushion supports 26. The arrangement of struts 25 and folding braces 29 is similar to an umbrella so that downward movement of the spider 28 shifts the extended and converging lower ends of the struts 25 outwardly, while the reverse movement draws the extremities of the struts towards each other. Each pair of struts 25 and cushion supports 26 carries a curved cowling 30. The cross-section of each cowling 30 is approximately one-third of a circle so that the three cowling members fit with their edges adjacent to each other when the landing gear is in its retracted position, such as that shown in Figs. 3 and 11, and by dotted lines in Fig. 9.

A pair of idler pulley wheels 31 are provided at the sides of the collar 1g, while hand driven pulley wheels 32 are provided near the upper end of the guide tube 24. Cables 33 connect the pulleys and are joined to the spider 28 so that the spider may be readily raised and lowered and thereby extend or retract the landing gear.

In order to completely streamline the fuselage and landing gear when in its retracted position, there is provided a tail sleeve 34. The tail sleeve 34 comprises an upper annulus 34a adapted to fit the lower extremities of the cowling members 30. Secured to the annulus 34a is a spirally wound spring 34b covered by suitable flexible material 34c and terminating in a rigid tip 34d. The arrangement is such that the covering 34c, tip 34d, and annulus 34a conform to the curvature of the fuselage and the cowling, as shown best in Fig. 3. The annulus is provided with inwardly directed bars 34e which are attached to a centrally disposed collar 34f. The collar is secured to a rod 35 which extends upwardly through the guide tube 24 and is provided with a handle 35a at its upper end. Between the handle and guide tube 24 there is mounted a spring 36 which normally holds the tail sleeve in a raised position against the collar 1g. A cable 37 extends from the tip member 34d to the cable 33, in such a manner that movement of the cable 33 to enlarge or extend the landing gear, raises the tip member 34d.

The landing gear is expanded or extended as follows: The spider 28 is moved from the dotted line position shown in Fig. 9 towards the solid line position therein. At the same time the handle 35a is depressed pushing downwardly on the rod 35 and causing the tail sleeve 34 to assume the position shown in Fig. 10. As soon as the cushion ball 27 has cleared the tail sleeve 34, the handle 35a may be released. During this interval the cable 33 has been pulling upwardly on the cable 37 causing the tip member 34d to rise. When the cushion members 27 reach their extended positions, the tail sleeve 34 is raised clear of the ground, as shown in Figs. 2 and 9. The three cushion members form a stable support for the aircraft enabling the fuselage to occupy a vertical position, such as that shown in Fig. 2.

Operation of the aircraft itself is as follows: From a landing position, shown in Fig. 2, the aircraft is adapted to rise and be tilted to a flying position such as that shown in Fig. 3. When in the position shown in Fig. 2, the wings 11 can be arranged in a position to create an upward lift when they rotate tending to raise the aircraft from the ground. By varying the angle of incidence of the several wings the speed of their rotation may be varied, as their resistance to the air is varied. Varying the speed of the motor varies the speeds of both the propeller and the wings because the torque of the propeller is balanced by the opposite torque of the wings. It should be here noted that the arrangement of wings and propeller here illustrated enables the propeller to be connected to a motor turning over at a greater speed than is desirable for the propeller speed. When taking off, the angle of attack of the wings 11 is increased until they are capable of sustaining the aircraft permitting the aircraft to rise vertically. As soon as the aircraft is clear of the ground the landing gear may be folded to the position shown in Fig. 3. By operation of the control arm 16 the aircraft is caused to tilt in the desired direction until its longitudinal axis assumes any desired angle. At slower speeds the aircraft may fly with its axis almost vertical. As the speed is increased, this angle is increased until at high speeds the fuselage approaches the horizontal, as shown in Fig. 3. As the angle increases between the plane of the wings and the horizontal, the horizontal speed is increased and the angle of attack of the wings must be increased to preserve the altitude. Thus when in the position described and shown in Fig. 3, the wings make practically a zero angle with the axis of the fuselage, and the rotation is relatively slow for the wings in this position offer the greatest resistance to rotation. The wings and their controls may be so arranged that they tend to assume the position shown in Fig. 2 so that the plane tends to shift to the vertical position and settle, thus rendering the airplane particularly foolproof. It is obvious that it is impossible to stall the airplane or put it into a spin if this be the case. In landing the landing gear is shifted to its open position as above set forth and the descent of the aircraft is checked by controlling the wings 11 so that the landing may be made as easy as desired. By arranging the fuel tanks and other fixed equipment in such a manner that one side of the fuselage tends to be heavier than the other, the fuselage can easily be maintained in a fixed position when in headlong flight such as that shown in Fig. 3. However, when more nearly in position shown in Fig. 2, it is often desirable to shift the fuselage, particularly for the ease of vision of the pilot and enable him to see in all directions. Thus by operating the operating means 23, the fuselage may be caused to rotate in the direction of movement of the propeller 6 or the wings 11. When desired the wings may be disengaged from the motor by action of the clutch 38 whereby the wings may idle.

My mechanism may be utilized merely as a propulsion and control means by mounting the wings and propeller as indicated in Fig. 2a in conjunction with other sustaining means such as a typical airplane wing or the dirigible illustrated.

When the wings are tilted in unison, they act as propulsion means in conjunction with the propeller and when tilted variously, they function principally as control means.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. An aircraft comprising, a motor, a rapidly revoluble propeller therefor, means revolubly supporting said motor, a plurality of radiating relatively slowly revoluble wing members connectible with said motor so as to rotate therewith in the opposite direction to the propeller and wherein the propeller torque is balanced by the opposite torque of the wing members, a fuselage associated with said means and normally free of the motor, and means for connecting the fuselage with the motor for rotating said fuselage directionally with said wing or propeller.

2. In an aircraft, a propeller, a control and propelling means comprising a set of airfoils sharing a common center, driving mechanism, said propeller and means connected with each other through said driving mechanism whereby the torque of one balances the torque of the other, control apparatus for shifting said airfoils to vary their resistance to the air, and a clutch device interposed between said means and said driving mechanism to render said means freely revoluble.

3. In an aircraft, a propulsion and sustaining means comprising, a rapidly revoluble propeller, a comparatively slowly revoluble set of wings, the blades of the propeller and the set of wings extending from a common axis and revolving in substantially parallel planes, a common driving means for the propeller and set of wings, the propeller and set of wings being so connected with the driving means that the rotation of either in response to the driving means is dependent upon the back thrust or reaction of the other, said wings being tiltable about their axes to shift their angles of incidence from approximately coincidence with their plane of revolution to positions approximately at right angles therewith, control means for tilting the wings, means for simultaneously shifting the common axis of the propeller and wings from the vertical to the horizontal and conversely.

GLEN E. McPHERREN.